(12) United States Patent
Marshall

(10) Patent No.: US 10,907,462 B2
(45) Date of Patent: Feb. 2, 2021

(54) DOWN-HOLE GAS SEPARATOR

(71) Applicant: Gary V Marshall, Gardendale, TX (US)

(72) Inventor: Gary V Marshall, Gardendale, TX (US)

(73) Assignee: Modicum, LLC, Midland, TX (US)

( * ) Notice: Subject to any disclaimer, the term of this patent is extended or adjusted under 35 U.S.C. 154(b) by 71 days.

(21) Appl. No.: 16/133,838

(22) Filed: Sep. 18, 2018

(65) Prior Publication Data
US 2019/0085677 A1 Mar. 21, 2019

Related U.S. Application Data

(60) Provisional application No. 62/614,945, filed on Jan. 8, 2017, provisional application No. 62/559,723, filed on Sep. 18, 2017, provisional application No. 62/614,958, filed on Jan. 8, 2017.

(51) Int. Cl.
*E21B 43/38* (2006.01)
*E21B 43/12* (2006.01)

(52) U.S. Cl.
CPC ............ *E21B 43/38* (2013.01); *E21B 43/121* (2013.01)

(58) Field of Classification Search
CPC ........ E21B 43/38; E21B 43/121; F04B 47/12; B01D 19/0042
See application file for complete search history.

(56) References Cited

U.S. PATENT DOCUMENTS

| | | | |
|---|---|---|---|
| 1,973,650 A | 9/1934 | O'brien | |
| 2,429,043 A | 10/1947 | Barnhart | |
| 2,652,130 A | 9/1953 | Ferguson | |
| 3,128,719 A * | 4/1964 | Jongbloed | E21B 43/38 166/105.5 |
| 4,241,788 A | 12/1980 | Brennan | |
| 4,366,861 A | 1/1983 | Milam | |
| 4,515,608 A | 5/1985 | Clegg | |
| 4,531,584 A | 7/1985 | Ward | |

(Continued)

FOREIGN PATENT DOCUMENTS

WO   WO 2018/013441 A1   1/2018

OTHER PUBLICATIONS

McCoy, J.N. et al, "An improved downhole gas separator," Petroleum Society of Canada Annual Technical Meeting, Jun. 14-18, 1999, paper No. PETSOC-99-66 (Abstract). https://www.onepetro.org/conference-paper/PETSOC-99-66, retrieved Nov. 24, 2014.

(Continued)

*Primary Examiner* — Brad Harcourt
(74) *Attorney, Agent, or Firm* — Charles Knobloch

(57) ABSTRACT

A method and apparatus for gas and solids separation from down-hole fluids is disclosed, including particular structural means for forcing the de-gassing of the gaseous liquid, including means for changing the velocity of the gaseous liquid (speed changes on each exit from the tubes owing to the volume difference between the tubes and the chamber), means for changing the direction of the gaseous liquid (owing to the flow changing direction from exiting one set of tubes to travel to the opening to enter the next set of tubes), and means for changing the pressure of the gaseous liquid (owing perhaps in part to evolution of gas upon entering increased volume).

31 Claims, 12 Drawing Sheets

(56) References Cited

U.S. PATENT DOCUMENTS

| | | | |
|---|---|---|---|
| 4,676,308 | A | 6/1987 | Chow et al. |
| 5,333,684 | A | 8/1994 | Walter et al. |
| 5,389,128 | A | 2/1995 | Lopes |
| 5,431,228 | A | 7/1995 | Weingarten et al. |
| 6,155,345 | A | 12/2000 | Lee |
| 6,179,054 | B1 | 1/2001 | Stewart |
| 6,228,146 | B1 | 5/2001 | Kuespert |
| 7,270,178 | B2 | 9/2007 | Selph |
| 7,377,314 | B2 | 5/2008 | Gonzalez |
| 7,823,635 | B2 | 11/2010 | Wright et al. |
| 9,518,458 | B2 | 12/2016 | Ellithorp et al. |
| 9,909,400 | B2 | 3/2018 | Ellithorp et al. |
| 10,385,672 | B2 | 8/2019 | Zahran |
| 10,436,008 | B2 | 10/2019 | Marshall |
| 10,570,720 | B2 | 2/2020 | Marshall |
| 2005/0081718 | A1 | 4/2005 | Carruth |
| 2007/0114020 | A1 | 5/2007 | Brekke |
| 2013/0032341 | A1 | 2/2013 | Raglin |
| 2014/0158343 | A1 | 6/2014 | Cobb et al. |
| 2018/0023379 | A1 | 1/2018 | Marshall |
| 2018/0187531 | A1 | 7/2018 | Ellithorp et al. |
| 2019/0055809 | A1 | 2/2019 | Ellithorp |
| 2019/0085677 | A1 | 3/2019 | Marshall |
| 2019/0085678 | A1 | 3/2019 | Marshall |
| 2020/0141224 | A1 | 5/2020 | Marshall |

OTHER PUBLICATIONS

Lackner, G., et al, "Effect of Viscosity on Downhole Gas Separation in a Rotary Gas Separator," SPE Production & Facilities (2002) 17(3):184-191, (Summary). https://www.onepetro.org/journal-paper/SPE-79076-PA, Summary retrieved Nov. 24, 2014.

McCoy, James N. et al, "A Laboratory Study With Field Data of Downhole Gas Separators," SPE Production & Operations (2007) 22(1), (Summary). https://www.onepetro.org/journal-paper/SPE-96619-PA, retrieved Nov. 24, 2014.

Bohorquez, R.R., et al, "Laboratory Testing of Downhole Gas Separators," SPE Annual Technical Conference and Exhibition, Nov. 11-14, 2007, SPE-109532, (Abstract). https://www.onepetro.org/conference-paper/SPE-109532-MS, retrieved Nov. 24, 2014.

Weingarten, J.S., et al, "Development and Testing of a Compact Liquid-Gas Auger Partial Separator for Downhole or Surface Applications," SPE Production & Facilities (1997) 12(1):34-40, (Summary). https://www.onepetro.org/journal-paper/SPE-30637-PA, retrieved Nov. 24, 2014.

Konylinski, L.S., et al, "Development and Field Test Results of an Efficient Downhole Centrifugal Gas Separator," Journal of Petroleum Technology (1985) 37(7):1295-1304, (Summary). https://www.onepetro.org/journal-paper/SPE-11743-PA, retrieved Nov. 24, 2014.

Schmoe, W. P., "Bottom-hole Gas Separators Increase Production," API Drilling and Production Practice (Jan. 1958), API-58-042, (Abstract). https://www.onepetro.org/conference-paper/API-58-042, retrieved Nov. 24, 2014.

Clegg, J.D., "Understanding and Combating Gas Interference in pumping wells," Drilling and Production Practice (Jan. 1963), API-63-149, (Abstract). https://www.onepetro.org/conference-paper/API-63-149, retrieved Nov. 24, 2014.

Podio, A.L., et al, "Evaluation and Performance of Packer-Type Downhole Gas Separators," SPE Production and Operations Mar. 23-26, 2013, SPE-164510, (Abstract). https://www.onepetro.org/conference-paper/SPE-164510-MS.

Podio, A.L., et al, "Decentralized Continuous-flow Gas Anchor," Journal of Canadian Petroleum Technology (1996) 35(7), (Abstract). https://www.onepetro.org/journal-paper/PETSOC-96-07-03, retrieved Nov. 24, 2014.

Evolution Oil Tools Inc, "Beam Pump Gas Separator", http://eotools.com/pdfs/6/Beam%20Gas%20Separator_Rev.E0_22-Sep-11.pdf, retrieved Oct. 24, 2018.

Evolution Oil Tools Inc, "Beam Gas Separator", https://eotools.com/images/pdfs/222-10-case_history_rev-a%20beam%20gas%20separator.pdf, retrieved Oct. 24, 2018.

PCT/IB/373, International Preliminary Report on Patentability, PCT/US2017/041283, International Filing Date Jul. 9, 2017.

PCT/ISA/210, International Search Report, PCT/US2017/041283, International Filing Date Jul. 9, 2017.

PCT/ISA/237, Written Opinion of the International Searching Authority, PCT/US2017/041283, International Filing Date Jul. 9, 2017.

\* cited by examiner

DOWN-HOLE GAS SEPARATOR

CROSS REFERENCE TO RELATED APPLICATIONS

This application claims priority from U.S. Provisional Patent Application Ser. No. 62/559,723, filed Sep. 18, 2017, U.S. Provisional Patent Application Ser. No. 62/614,945, filed Jan. 8, 2018 and U.S. Provisional Patent Application Ser. No. 62/614,958, filed Jan. 8, 2018, the entire contents of all of which are hereby incorporated by reference.

TECHNICAL FIELD

Disclosed herein are improvements to down-hole gas separation methods, apparatus, and systems, in particular for separating gas and solids from produced fluids in a wellbore, while also preventing gas-lock of the pump.

BACKGROUND ART

In the current state of the art, pumping wellbore fluids has the propensity to produce large pockets of gas, over twenty foot (20') columns, and thereby gas-locking a pump, preventing production. There is a strong need to separate gas and solids from production fluids in the wellbore so that gas does not inhibit pumping efficiency.

In essence, fluid is pumped up from a fluid retrieving section of the bottom hole assembly. As the pumped fluid is "sucked" up the production tube, gas separates from the fluid and bubbles to the top of the fluid column. Eventually, enough gas separates and rises to the top of the fluid column that a pump becomes gas locked and can no longer pump. The pump must stop pumping and wait for the gas to dissipate before it can resume pumping.

There is a strong need to separate gas from production fluids in the wellbore so that only liquids are pumped, thus preventing gas locking of the well and providing more liquid returns from the pump. The inventor has recognized that the problem is the long column of built-up gas and the need for a solution to effectively reduce that long column of gas seen by the pump.

DISCLOSURE OF THE INVENTION

Figure 1:
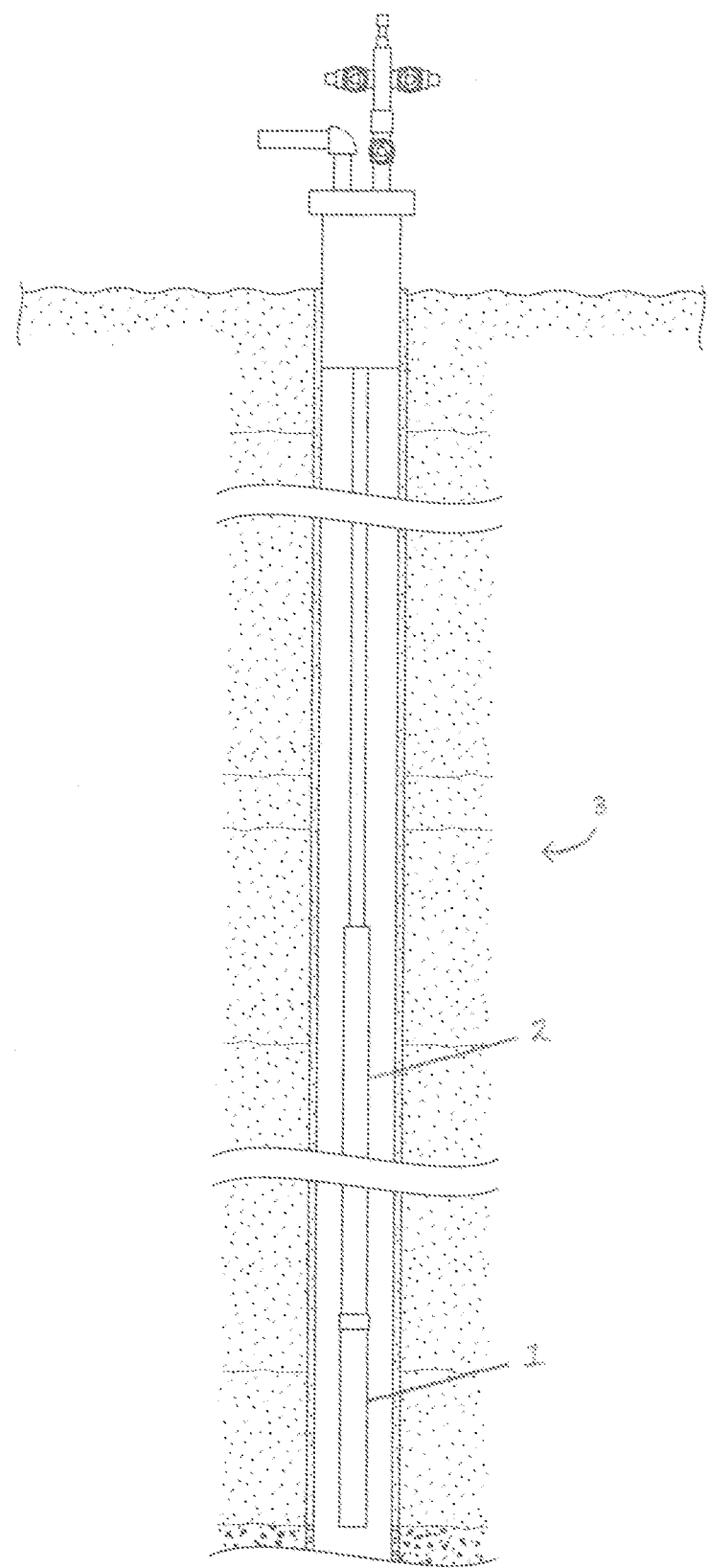
FIG. 1 illustrates a side cross-section view showing an example of the placement of down-hole gas separator of the present invention, in relation to a pump and wellbore.

FIG. 1 illustrates a side cross-section view showing an example of the placement of down-hole gas separator of the present invention, in relation to a pump and wellbore. Down-hole gas separator 1 is attached below a pump 2 on a production string, the assembly disposed in a wellbore 3.

Figure 2:
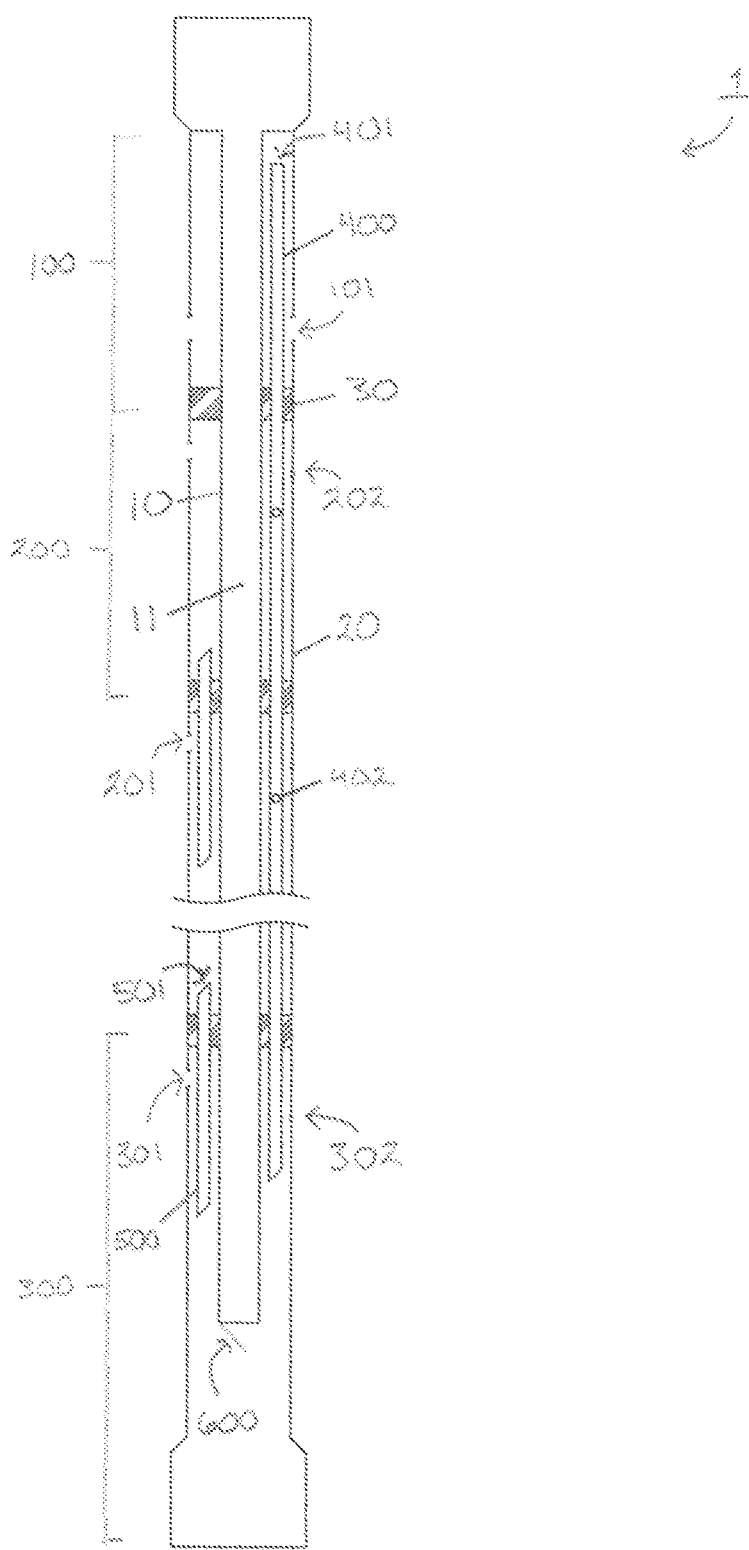
FIG. 2 illustrates a side cross-section view of an example down-hole gas separator depicting the major chambers and a number of the internal components.

FIG. 2 illustrates a side cross-section view of an example the down-hole gas separator 1 depicting the major chambers and a number of the internal components. Gas separator 1 is an assembly of three types of chambers: a top chamber 100, referred to as a pressure loss chamber (PLC), is used to collect separated gas and expel the gas into the wellbore, one or more (in a preferred example, several and in another preferred example, fifteen or more) intermediate chambers 200, referred to as production chambers (PC) or a cascade of production chambers, and a terminating chamber (TC) 300 at the bottom.

The chambers are formed by the region between a production tube or string 10 that is enclosed in an outer tube 20 that is disposed about the production tube 10. One or more fluid barriers 30, such as gaskets or seals, plug the region between the production tube 10 and outer tube 20, thereby separating the chambers from each other.

In one example, gas exit orifices (GE-PLC) 101, (GE-PC) 201, (GE-TC) 301 open through the outer tube 20 of their respective chambers PLC 100, PC 200, TC 300. In one example, the gas exit orifices (GE-PLC) 101 are located towards the bottom of chamber (PLC) 100. In one example, the gas exit orifices (GE-PC) 201 and (GE-TC) 301 are located towards the top of their respective chambers (PC) 200 and (TC) 300.

In one example, fluid intake ports or orifices (FI-PC) 202 and (FI-TC) 302 open through the outer tube 20 of their respective chambers (PC) 200 and (TC) 300. In one example, the fluid intake ports (FI-PC) 202 and (FI-TC) 302 are located towards the top of their respective chambers (PC) 200 and (TC) 300, but below the respective gas exit orifices or ports (GE-PC) 201 and (GE-TC) 301.

In one example, special ports or orifices 11, referred to as thief jet ports (TJP), open through production tube or string 10 and into the chambers (PC) 200 and (TC) 300. In one example, ports 11 are located towards the bottom of each chamber. In one example, ports 11 are engineered to restrict fluid flowing into production string 10. In one example, ports 11 are engineered to restrict fluid flowing into production string 10 such that the fluid flow rate is less than the flow rate in which the entrained gas will bubble out of the fluid. In one example, ports 11 are engineered to restrict fluid flowing into production string 10 such that downward velocity of draw of the fluid within the chamber is at a rate is less than six inches (6") per second.

In one example, a gas "highway" tube 400 runs through the chambers, collecting gas that has been separated from wellbore fluids that are flowing through the chambers. Tube 400 has orifices 402 within the intermediate chambers 200.

In one example, one or more solids management tubes (SMT) 500 have a top open end 501 placed near the floor or lower portion of an intermediate chamber 200, with the tubes 500 extending downward into the next lower chamber. The solids management tubes (SMT) 500 provide a downward path for residual solids that have separated at the bottom of the chamber.

In one example, production tube 10 is sealed at its lower end, which terminates in the terminating chamber (TC) 300. In one example, the lower end of production tube 10 is fitted with a check valve 600, such as a flapper valve, that prevents fluids from entering the production tube from the lower terminating end. When the separator 1 is to be retrieved from the well, check valve 600 serves to open and dump or purge fluids as the separator is raised and withdrawn. Further, check valve 600 serves to purge or "burp" residual solids build-up that can collect within the production tube 10, at the bottom.

In one example, valve 600 restricts fluid from entering the DIP tube 10 via a thief jet port (TJP) 11. In one example, purge valve 600 includes a thief jet port (TJP) 11 to allow fluid to enter the DIP tube 10 at a restricted rate.

Figure 2A:
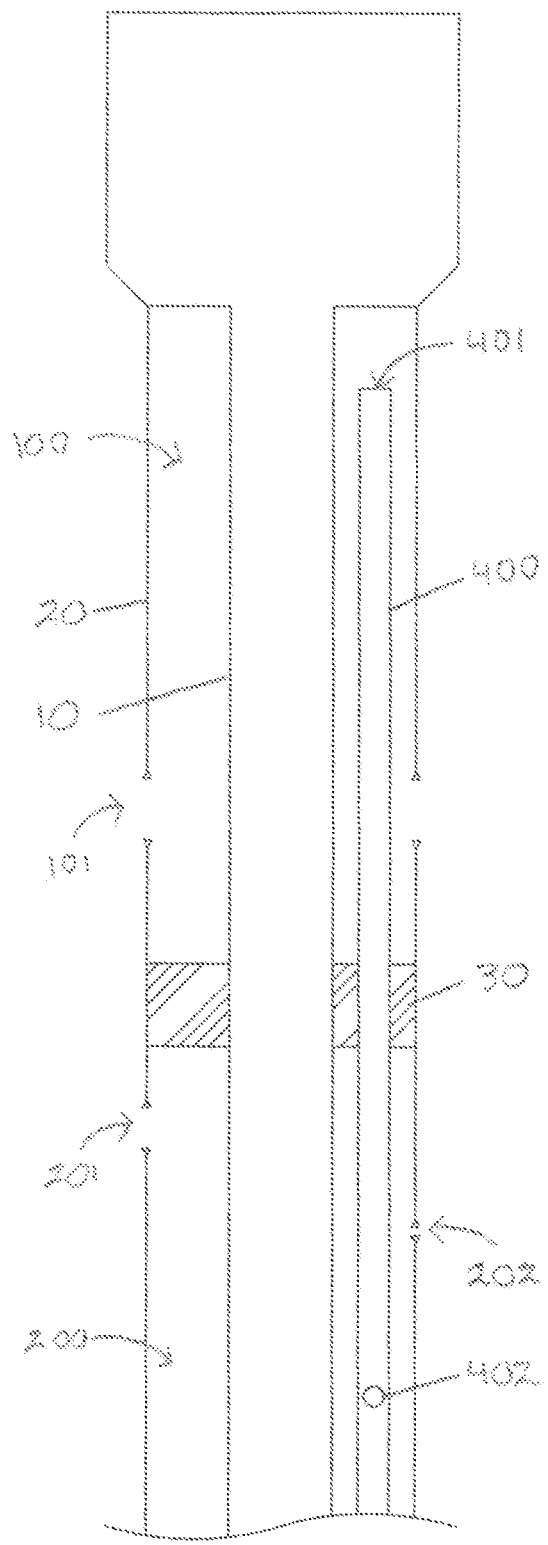
FIG. 2A illustrates a side cross-section view of an example top chamber, called a pressure loss chamber (PLC), of the down-hole gas separator.

FIG. 2A illustrates a side cross-section view of an example of the top chamber, called the pressure loss chamber (PLC), of the down-hole gas separator. The chamber 100 is formed by the region between a production tube or string 10 that is enclosed in an outer tube 20 that is disposed about the production tube 10. Production tube 10 may also be called a DIP tube. In this example, fluid barrier 30, such as a gasket or seal, plugs the region between the production tube 10 and outer tube 20 (sometimes called a "shroud"), thereby separating the pressure loss chamber (PLC) 100 from the other chambers below it. Gas exit orifices (GE-PLC) 101 open through the outer tube 20 of chambers 100. In one example, the gas exit orifices (GE-PLC) 101 are located towards the bottom of chamber 100. A "gas highway" tube (GHT) 400 comes up through gasket 30 from the chambers below, terminating near the top of chamber 100 with open end 401, which may be called a gas tube or gas highway exit port.

Below gasket 30 is shown the upper portion of a first production chamber (PC) 200. Gas exit orifices (GE-PLC) 101 are disposed in the upper portion of outer tube 20. Fluid intake orifices (FI-PC) 202, disposed lower than the gas exit orifices, are disposed on outer tube 20. Orifice or port 402 is disposed on gas highway tube (GHT) 400 within chamber (PC) 200. Port 402 allows gas that has separated from fluids in the production chamber (PC) 200 to enter the gas highway tube (GHT) 400, facilitating exhaust of the separated gas.

Figure 2B:
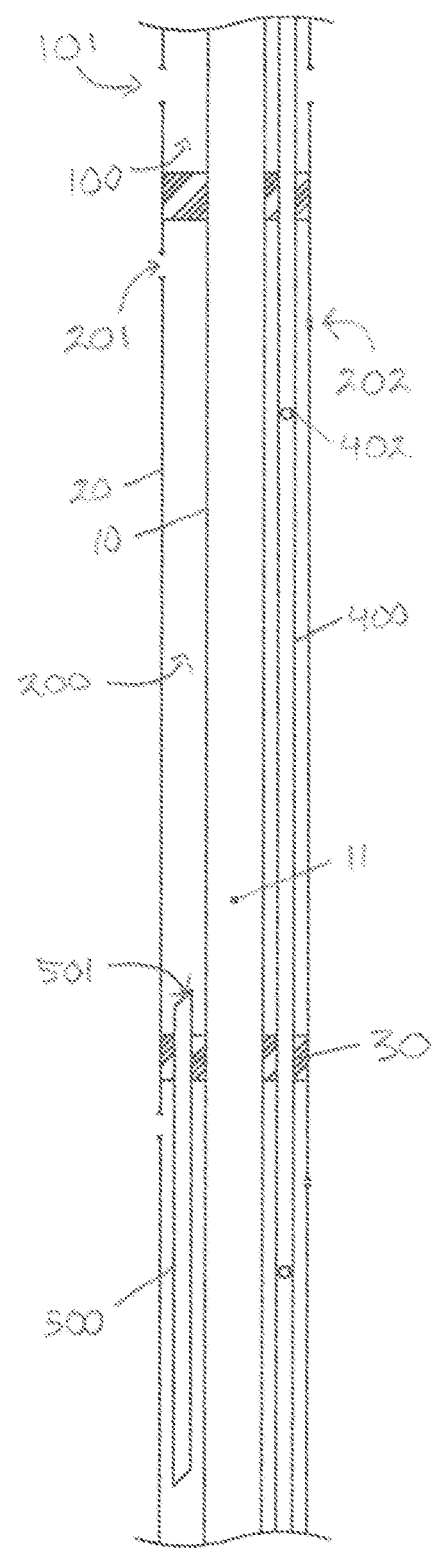
FIG. 2B illustrates a side cross-section view of an example of one (of several) intermediate chamber, called a production chamber (PC), of the down-hole gas separator. The production chamber (PC) in this example is placed directly below the pressure loss chamber (PLC).

FIG. 2B illustrates a side cross-section view of an example of one (of several) intermediate chamber, called the production chamber (PC), of the down-hole gas separator. The production chamber (PC) 200 in this example is placed directly below the pressure loss chamber (PLC) 100.

Gaskets 30 are disposed at the top and at the bottom of production chamber (PC) 200. Within production chamber (PC) 200, thief jet ports (TJP) 11 are disposed into production tube 10, towards the bottom of chamber 200. The thief jet ports (TJP) 11 are engineered to restrict rate of flow into the DIP tube 10. Fluid intake orifices (FI-PC) 202, disposed lower than the gas exit orifices (GE-PC) 201, are disposed on outer tube 20. Orifice or port 402 is disposed on gas highway tube (GHT) 400 within chamber (PC) 200. Port 402 allows gas that has separated from fluids in the production chamber (PC) 200 to enter the gas highway tube (GHT) 400, facilitating exhaust of the separated gas.

In one example, one or more solids management tubes (SMT) 500 have a top open end 501 placed near the floor or lower portion of an intermediate chamber 200, with the tubes 500 extending downward into the next lower chamber. The solids management tubes (SMT) 500 provide a downward path for residual solids that have separated at the bottom of the chamber.

Figure 2C:
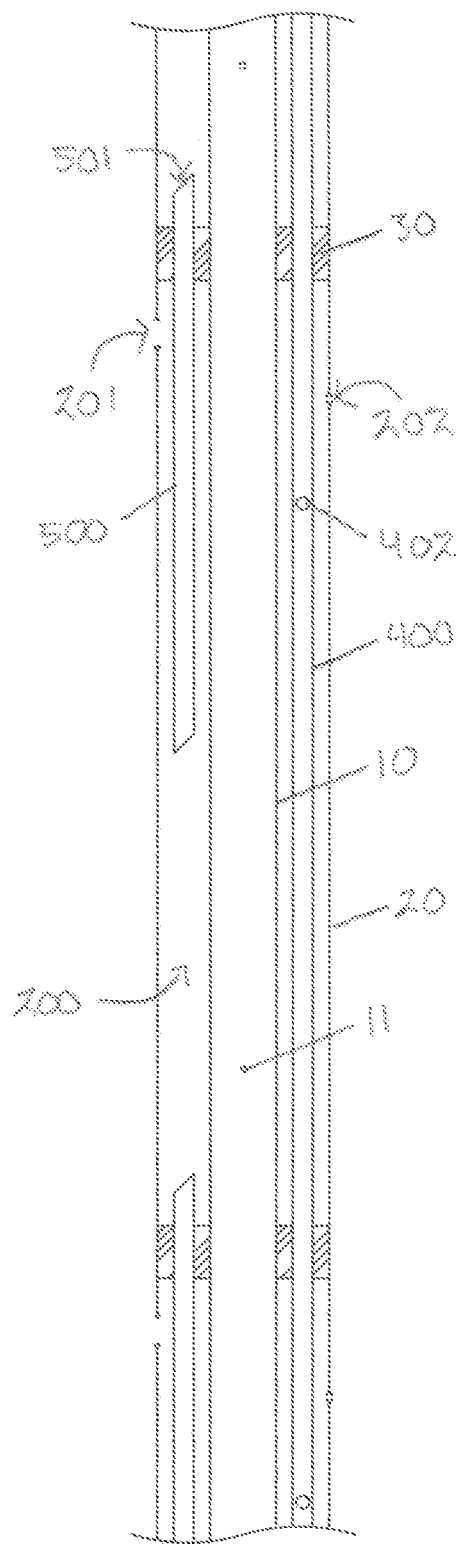
FIG. 2C illustrates a side cross-section view of an example of additional intermediate production chambers (PC), as cascaded in the down-hole gas separator.

FIG. 2C illustrates a side cross-section view of an example of additional intermediate production chambers (PC) 200, as cascaded in the down-hole gas separator. An intermediate production chamber (PC) 200, as illustrated, shows the placement of solids management tubes 500 between adjacent chambers. A top end 501 terminates towards the bottom of a higher chamber 200. The tube 500 extends downward through gasket 30 into the next lower chamber, in this illustration a chamber 200, and terminates somewhere midway down the chamber. Thief jet ports (TJP) 11 are disposed on DIP tube 10, in the lower portion of chamber 200. A number of production chambers (PC) 200 are stacked in this way, forming a cascade, the number depending on the performance characteristics and conditions of the well. In one example, fifteen or more production chambers (PC) are stacked.

Figure 2D:
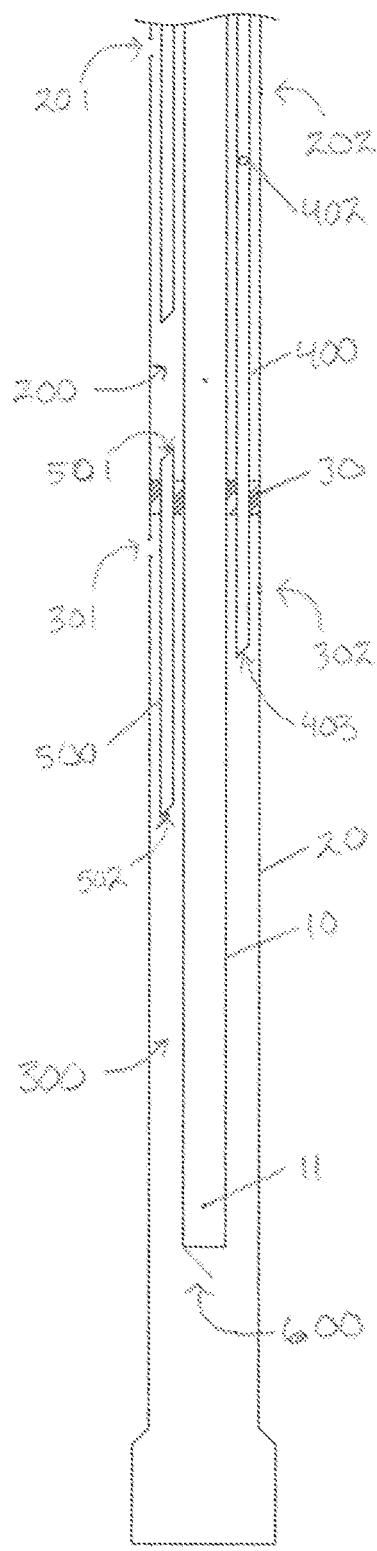
FIG. 2D illustrates a side cross-section view of an example terminating chamber (TC), attached beneath the bottommost production chamber (PC).

FIG. 2D illustrates a side cross-section view of an example of the terminating chamber (TC), attached beneath the bottommost production chamber (PC). Terminating chamber (TC) 300 is sealed from the last production chamber (PC) 200 by a gasket 30. In this example, a solids management tube (SMT) 500 extends through gasket 30 from the adjacent production chamber (PC) 200 into terminating chamber (TC) 300, with its bottom lower opening 502 opening into the terminating chamber (TC) 300. The bottom lower end 403 of gas highway tube (GHT) 400 terminates and opens into terminating chamber (TC) 300, near the top portion of the chamber. In one example, opening end 502 of solids management tube (SMT) 500 is lower than the opening end 403 of the gas highway tube (GHT) 400. Thief jet ports (TJP) 11 are disposed on DIP tube 10, towards the lower portion of tube 10.

In one example, the bottom end of DIP tube 10 is fitted with a check valve 600, such as a flapper valve, that prevents fluids from entering the production tube from the lower terminating end. When the separator 1 is to be retrieved from the well, check valve 600 serves to open and dump or purge fluids as the separator is raised and withdrawn. Further, check valve 600 serves to purge or "burp" residual solids build-up that can collect within the production tube 10, at the bottom.

Figure 3A:
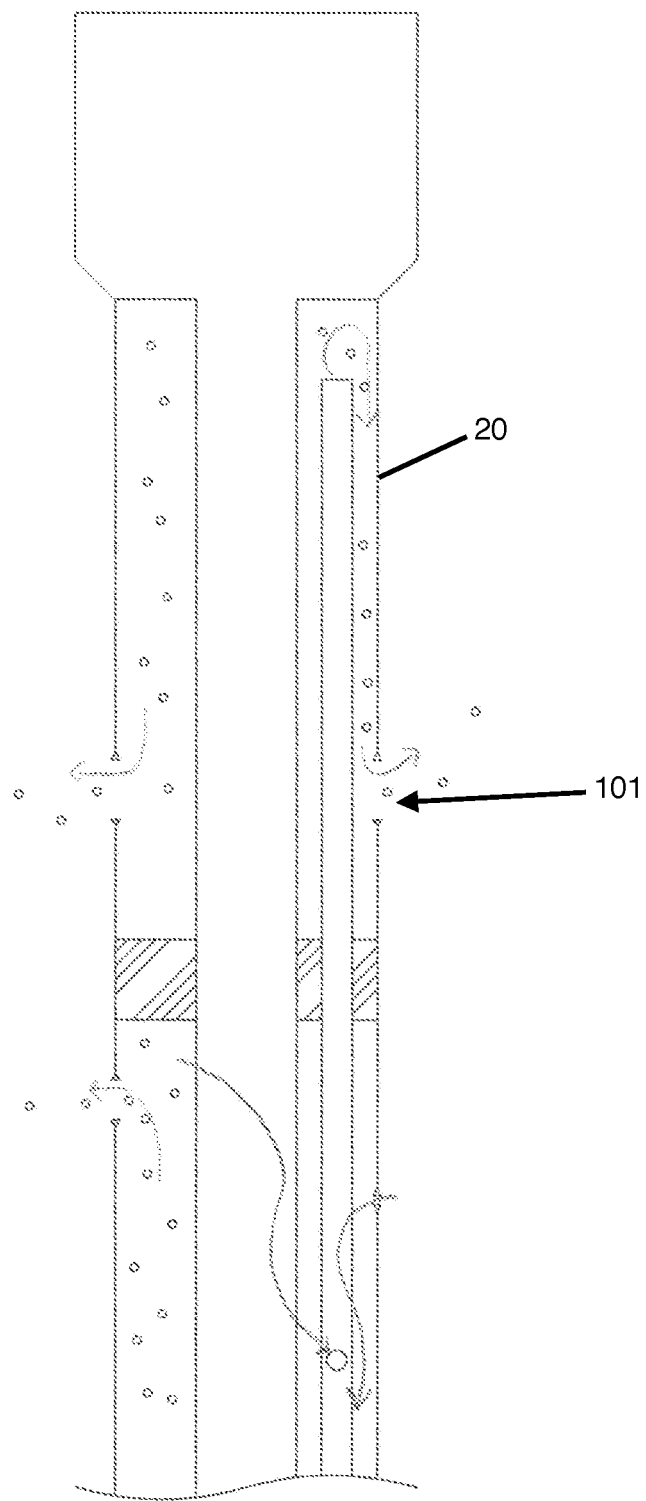
FIG. 3A illustrates the pressure loss chamber (PLC) of FIG. 2a with fluid flow paths.

FIG. 3A illustrates a side cross-section view of an example of the top chamber, called the pressure loss chamber (PLC), of the down-hole gas separator, with fluid flow paths. The pressure loss chamber (PLC) serves to expel separated gases that have been collected from the gas highway tube (GHT). The pressure loss chamber (PLC) may be called an off-gas cylinder or a gas exhaust chamber or cylinder. In one example, the pressure loss chamber (PLC) is above the rest of the production chambers and gas separated by the lower production chambers enters a gas highway tube (GHT) whose upper termination is in the pressure loss chamber (PLC). The separated gas flows upwards into the pressure loss chamber (a/k/a gas exhaust chamber) and the gas exits outside of the outer tube 20 by way of one or more gas exhaust ports (GE-PLC) 101.

Figure 3B:
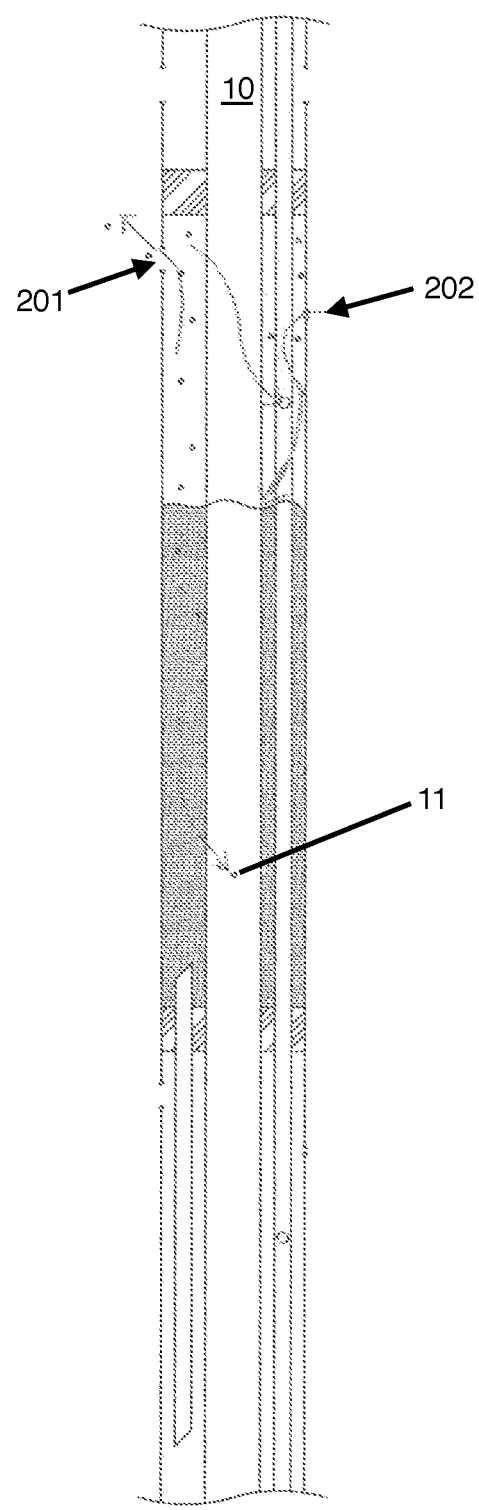
FIG. 3B illustrates the production chamber (PC) of FIG. 2b with fluid flow paths.

FIG. 3B illustrates a side cross-section view of an example of one (of several) intermediate chamber, called the production chamber (PC), of the down-hole gas separator. The production chamber (PC) in this example is placed directly below the pressure loss chamber (PLC), with fluid flow paths. Fluids enter the chamber, which may also be called a production cylinder, via the fluid intake port(s) (FI-PC) 202.

Gas separates from the entering fluids and will tend to rise to the top of the chamber. The separated gas may exit the production chamber (PC) via the gas exit port(s) (GE-PC) 201. In one preferred example, fluid intake port is a 0.5 inch hole and is located one (1) inch below and opposite (on the other side of the tube 20) of a gas exit port 201. In one preferred example, gas exit port (GE-PC) 201 is a 0.5 inch hole and is located one (1) inch above and opposite (on the other side of the tube 20) of a fluid intake port (FI-PC) 202.

The fluid with removed gas sinks towards the bottom of the chamber. This separated fluid may exit the chamber through a thief jet port(s) (TJP) 11 into the DIP tube 10. The solids management tube (SMT) 500 towards the bottom of the chamber enable solids to flow downward through the tub and exit this production chamber. In one example, multiple production chambers are combined serially and the chambers may each have different sizes in length. In one example, the sizes of the production chambers vary in length from 18 to 48 inches each.

Figure 3C:
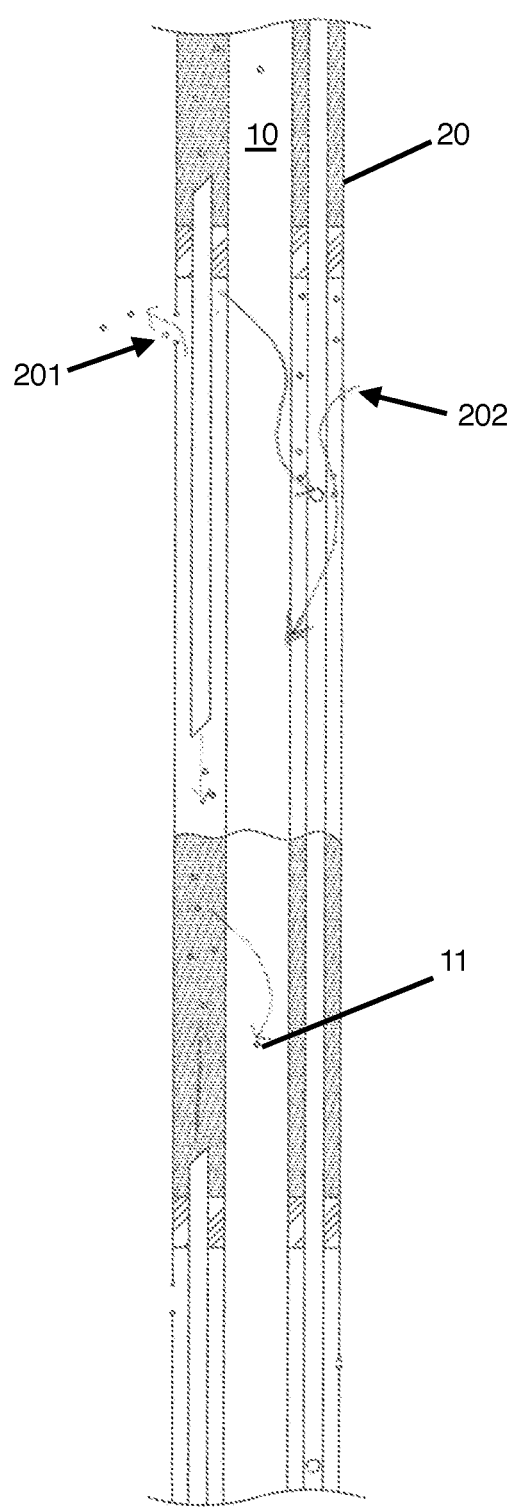
FIG. 3C illustrates the additional intermediate production chambers (PC) of FIG. 2c with fluid flow paths.

FIG. 3C illustrates a side cross-section view of an example of additional intermediate production chambers (PC), as cascaded in the down-hole gas separator, with fluid flow paths.

Figure 3D:
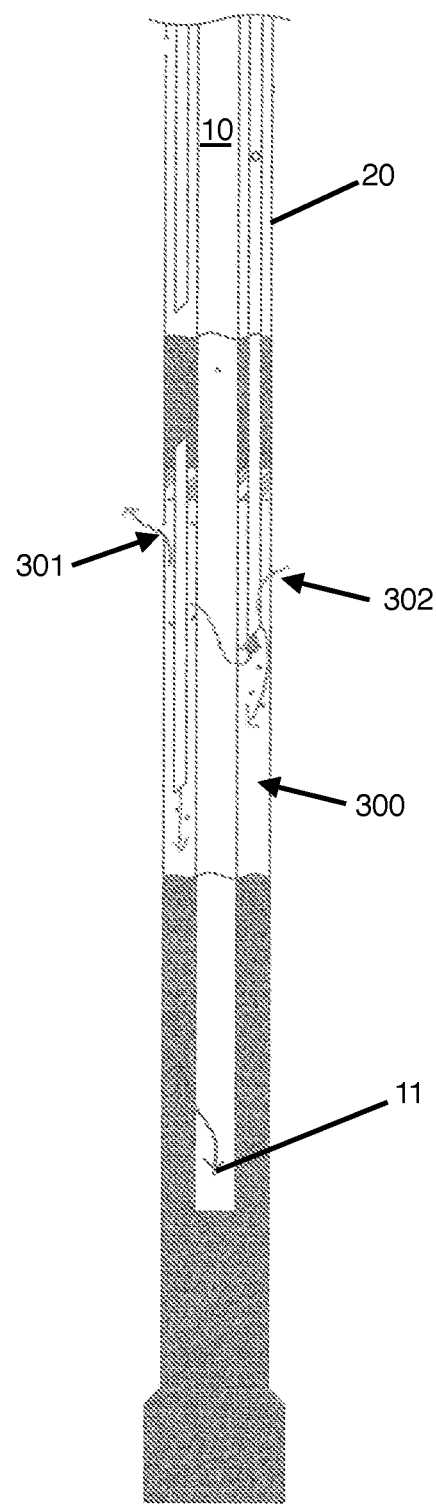
FIG. 3D illustrates the terminating chamber (TC) of FIG. 2d with fluid flow paths.

FIG. 3D illustrates a side cross-section view of an example of the terminating chamber (TC), attached beneath the bottommost production chamber (PC), with fluid flow paths. The terminating chamber (TC) may be called a purge chamber in some examples. In this example, solids from the adjacent chamber above pass down solids management tube, which exits into terminating chamber (TC) 300, dumping the solids. Separating gas accumulates towards the upper portion of the terminating chamber (TC) 300, escaping into the gas highway tube and/or through gas exit port(s) (GE-TC) 301. Fluids entering into the terminating chamber (TC), including through fluid intake port(s) 302, are able to enter the DIP tube 10 by way of thief jet port(s) (TJP) 11.

In one example, the terminating chamber (TC) or purging chamber is located at the bottom of the series of production chambers, just above a mud shoe. The bottom of the chamber is open to a mud shoe, there is no solids chute exiting the bottom of the purging chamber, and both the DIP tube and the gas highway tube (GHT) terminate within the purging chamber.

Figure 4:
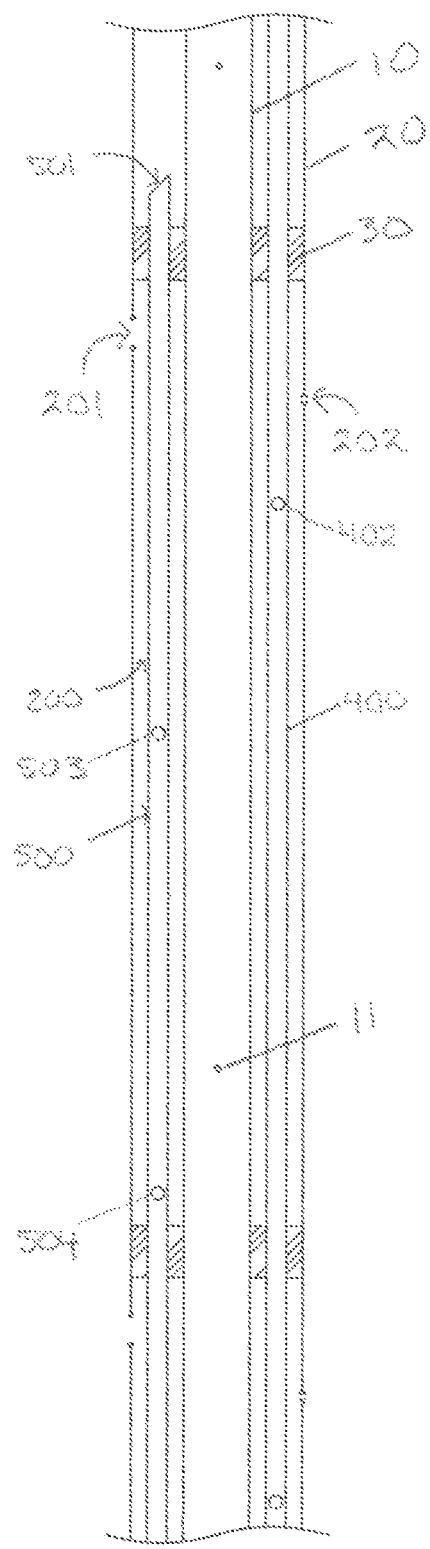
FIG. 4 illustrates another example of a portion of the down-hole gas separator depicting a cascade of production chambers (PC) where the solids management tube (SMT) is continuous through several production chambers.

FIG. 4 illustrates another example of a portion of the down-hole gas separator depicting a cascade of production chambers (PC) where the solids management tube (SMT) is continuous through several production chambers. In one example, the solids management tubes (SMT) 500 are replaced with a single solids management tube (SMT) 500 that extends from the pressure loss chamber (PLC) 100 through the production chambers 200, terminating into the terminating chamber (TC) 300. In this configuration, orifices 503, 504 are disposed into the solids management tube (SMT) 500 within each of the production chambers 200. In one example, orifices 503 are disposed midway up the chamber 200 and orifices 504 are disposed toward the bottom of the chamber 200.

In a further example, the solids management tubes are connected to each other, effectively forming a continuous tube. In one example, openings or ports are disposed in the tube (or tube assembly) near the bottom of each production chamber (PC), enabling solids to enter and flow downwards. In one example, openings or ports are disposed in the tube (or tube assembly) near the top of each production chamber (PC), enabling gas to enter and flow upwards.

Figure 5:
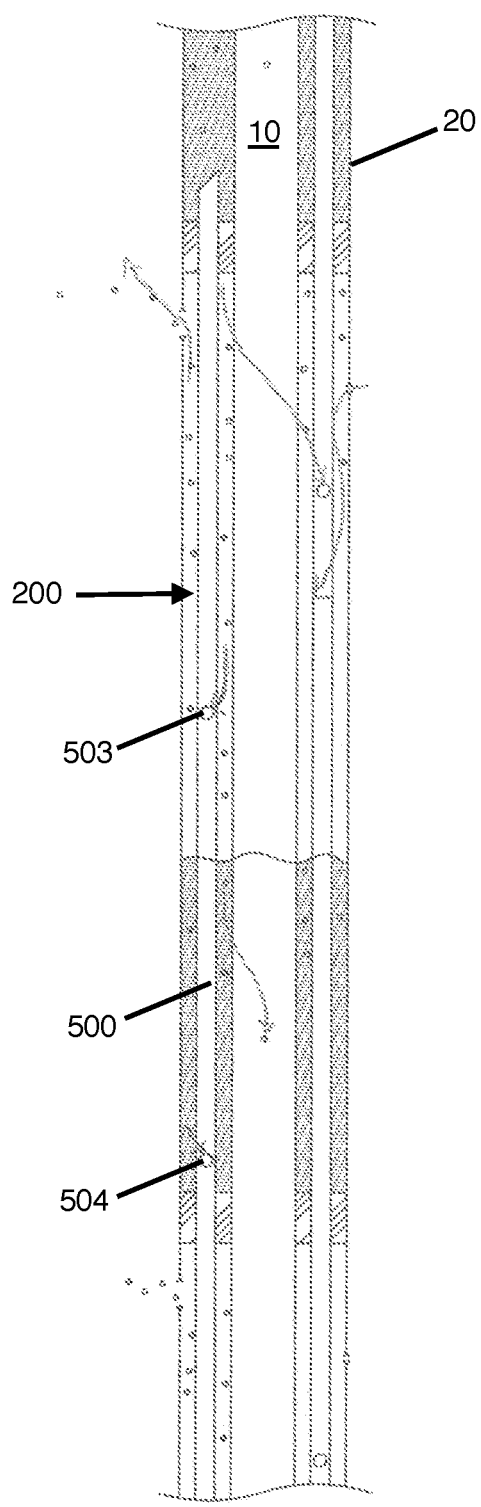
FIG. 5 illustrates the portion of the down-hole gas separator of FIG. 4 with flow paths.

FIG. 5 illustrates another example of a portion of the down-hole gas separator depicting a cascade of production chambers (PC) where the solids management tube (SMT) is continuous through several production chambers, with flow paths. Solids forming near the bottom of the chamber 200 exit through orifice(s) 504. In one example, solids management tube also allows for gas to flow up through the tube 500 from below, for example, gases collected by orifice(s) 503.

EXAMPLES

In a preferred example, a separator is configured with an off-gas chamber at the top, followed by a cascade of fifteen production chambers below the off-gas chamber, followed at the bottom with a purge chamber. In one example, the DIP tube terminates in the purge chamber and its end affixed with a purge valve.

In one example, the inner production tube 10, the DIP tube, is 316 stainless steel and ranges from 1.00 to 1.25 inches in diameter. In one example, the outer diameter of the outer tube 20 ranges from two and three eighths inches (2⅜") to three and one half inches (3½"). In one example, a collar is attached to the top and/or bottom of the separator to interface the separator with other parts of the bottom hole assembly.

In one example, fluid intake ports and gas exit ports are disposed on opposite sides of the outer tube of the chamber (e.g., 180 degrees from each other). In one example, fluid intake ports are disposed about one inch below the gas exit ports.

In one example, fluid intake ports are 7/64 inch diameter sized holes while the gas exit ports are one-half inch diameter sized holes.

In one example, the thief jet ports (TJP) are designed to restrict the flow of fluid into the DIP tube to a rate that is less than the bubble escape velocity, providing time for the gas to separate from the wellbore fluids. In one example, the bubble escape velocity is the rate at which gas may bubble out of a liquid due to Bernoulli principles, about six inches per second. In a preferred example, the thief jet ports (TJP) are 7/64 inch diameter holes. In one example, the thief jet ports (TJP) are jetted to restrict flow.

In one example, the thief jet ports (TJP) are located about the level at which solids are expected to accumulate.

In one example, the separator comprises one or more production chambers with an offgas chamber on the top. In one example, the separator also includes a purge chamber at the bottom. The DIP tube passes through the offgas chamber, but does not have any openings or direct fluid communication with the offgas chamber. One or more tubes, also called a gas highway tube (GHT) with an upper end 401 and one or more gas highway intake ports 402, has its upper end 401 terminating inside the offgas chamber, with the gas highway intake ports 402 located in other chambers below the offgas chamber. The offgas chamber has one or more gas exit ports (GE-PLC) 101 for allowing gas to exit the separator 1 and into the wellbore annulus.

In one example, the production chamber has one or more tubes, solids management tubes, also called solids chutes. The solids chute is in fluid communication with the inside and outside of the production chamber: a first open end on the solids chute is inside the production chamber and a second open end of the solids chute is outside the production chamber and below the first end. In one example, the first open end is located not more than an inch above the bottom of the production chamber, and the thief jet ports (TJP) in the DIP tube are located two inches above the solid chute's first open end. In a preferred example, the lower open end of the solids chute extends fifty percent down into the lower production chamber.

In a preferred example, the solids management tube is made of a non-stick material such as a Teflon or stainless steel. In one preferred example, the solids management tube has one or more open ends cut at an angle.

In one example, the thief jet ports (TJP) increase flow slightly with each lower production chamber. In one example, the thief jet ports (TJP) range in size from $5/32$ inch diameter to $6/32$ inch diameter. In a further example, the thief jet ports of the upper production chambers are $6/32$ inch diameter, the thief jet ports (TJP) of the middle production chambers are $7/32$ inch diameter, and the thief jet ports (TJP) of the lower production chambers are $8/32$ inch diameter. In one preferred example, fifteen production chambers are used. The uppermost five production chambers use thief jet ports (TJP) of $6/32$ inch diameter, the mid five production chambers use thief jet ports (TJP) of $7/32$ inch diameter, and the lower five production chambers use thief jet ports (TJP) of $8/32$ inch diameter.

In one example, gas exit port(s) (GE-PLC) 101 of the pressure loss chamber (PLC) 100 are located near the bottom of the chamber. In one example, the gas exit orifice/port(s) (GE-PLC) 101 of the pressure loss chamber (PLC) 100 are 0.75 inches diameter.

In one example, the gas highway tube intake ports 402 are located in one or more production chambers 200 or the purge chamber 300 on the gas highway tube (GHT) 400, located one inch below the production chamber fluid intake ports (FI-PC) 202 or three inches below the top of the purge chamber 300.

In one example, the gas highway tube intake ports 402 are located in one or more production chambers 200 or the purge chamber 300 on the gas highway tube (GHT) 400, located two inches below the production chamber fluid intake ports 402 or four inches below the top of the purge chamber 300.

In a preferred example, the gas highway tube intake ports 402 are orifices 0.25 inches in diameter.

In a preferred example, the gas highway tube (GHT) 400 is made of stainless steel. In one example, the gas highway tube (GHT) 400 has an outer diameter of 0.5 inches and an inner diameter of $7/16$ inches.

In one example, the gas highway tube (GHT) 400 terminates in the pressure loss chamber (PLC) 100 with an opening one inch below the top of the pressure loss chamber (PLC) 100.

In an example, the ends of the gas highway tube (GHT) 400 are angled.

In a preferred example, the pressure loss chamber (PLC) 100 is eight inches long. In an example, the pressure loss chamber 100 has multiple gas exit ports (GE-PLC) 101.

Recap of Basic Operation

Wellbore fluid enters a production chamber though a fluid intake port(s). As the fluid enters, gas "bubbles" out of the fluid and rises towards the top of the production chamber. As the gas separates, the liquid and solids "sink" towards the bottom of the production chamber. The separated gas rises above the fluid intake port and exits the production chamber via a gas exit port(s). Near the bottom of the production chamber, fluid is pumped out of the production chamber by entering the DIP tube via thief jet ports (TJP).

In a preferred example, the thief jet ports (TJP) are designed to restrict flow to less than bubble escape velocity, or six inches per second. Restricting the fluid flow into the DIP tube such that gas bubbles can form and escape from the fluid at a rate of about six inches per second helps ensure more gas separates from the fluid. Solids, which have "sunk" towards the bottom of the chamber flow down a solids chute and exit the production chamber.

In a preferred example, the entrance into a solids chute is as close to the bottom of the production chamber as possible, not more than one inch, and the thief jet port(s) (TJP) is slightly above the solids chute, or about two inches. A surprising result is in the operation of the solids chute (the solids management tube) in that gas will bubble up the chute as solids travel down the chute. This fluid operation helps prevent solids from clogging the chute.

Purge Chamber Operation

In one example, fluid flow is restricted from entering the DIP tube by thief jet ports (TJP) but a check valve at the bottom of the DIP tube is configured to allow quick evacuation of fluids out of the DIP tube with minimal or no restricted flow. Further, the check valve allows for purging or dumping of remaining solids that have accumulated in the bottom of the DIP tube. In one example, the check valve is a flapper valve.

In one example, the bottom of the purge chamber is open.

In one example, the lower termination of DIP tube 10 is closed.

In one example, the outer tube 20 shroud of the purge chamber 300 extends below the lower termination of the DIP tube 10. In one example, the outer tube 20 shroud of the purge chamber 300 extends forty-eight inches (48") below the lower termination of the DIP tube 10.

In one example, a solids chute from an upper chamber does not extend into the purge chamber.

Pressure Loss Chamber (offgas chamber) Operation

In one example, during operation, gas which separates from entering fluid in a production chamber rises to the top of the chamber and exits out of the production chamber gas exit port(s) (GE-PC) 201. However, this gas may not exit fast enough to evacuate all the gas in the production chamber. In this instance, gas will accumulate at the top of the chamber. Once the separated gas fills the production chamber sufficiently, it will reach the gas highway intake port 402 and rise up out of the chamber and exit the gas highway tube (GHT) 400 into the offgas chamber 100. In this chamber 100, gas will accumulate until it reaches the chamber's gas exit ports (GE-PLC) 101 and exit the separator system 1.

Example Assembly of Separator

In one example, a long tube 10, such as a DIP tube is sized to a length necessary for a desired plurality of chambers. A plurality of separating gaskets 30 are disposed about the DIP tube such that the DIP tube penetrates the center axis of each gasket. Each gasket, therefore, extends radially outward from the DIP tube. The gaskets ultimately become the tops and bottoms of the chambers. The top chamber, the offgas chamber 100, is not in direct fluid communication with the DIP tube. One or more gas highway tubes 400 are disposed in an axial direction parallel to the DIP tube and penetrate one or more of the separating gaskets. The intermediate chambers 200, a cascade of production chambers, are separated by the gaskets. One or more solids management tubes 500 penetrate the separating gaskets, providing communication for solids downward, and gas upward, from the bottom of a production chamber into the middle portion of the next lower chamber. An outer shroud 20 is then slid over and encloses this assembly. Thus, the gasket and outer shroud are sized to create these chambers between the gaskets and a fluid barrier seal so that fluid does not flow between the separating gaskets and the shroud.

In one example, the length of the solids chute 300 and the gas highway tube (GHT) 400 are chosen such that their respective openings and lengths correspond with desired final positions within each respective chamber.

In one example, the fluid intake ports (FI-PC) 202 and gas exit ports (GE-PC) 201 are positioned and arranged in the shroud 20 to align with the desired location within the internal chambers created by the gaskets 30. Similarly, the location of the thief jet ports (TJP) 11 and the gas highway intake ports 402 are positioned and arranged based on desired location with the created chambers between the separating gaskets 30.

In one example, gasket 30 is formed of a ring-shaped rubber, or elastomeric medium that is sandwiched between two metal plates. The outside diameter of the gasket 30 is selected to fit inside of outer tube or shroud 20 while still sealing against the outer wall of the DIP tube 10. In one example, plates are welded to the DIP tube.

In one example, gasket 30 is compressed slightly to extrude the inner rubber or elastomeric medium to help ensure a proper seal when installed around a DIP tube 10 and/or within the outer tube/shroud 20.

In one example, disclosed is a downhole gas separator comprising a production chamber, one or more intake ports, one or more exit ports, one or more dip tubes, one or more thief jet ports (TJP), and one or more solids management tubes (SMT); wherein the production chamber is disposed below a production tube, and the production tube has an upper portion, a lower portion, an inside and an outside; wherein intake and exit ports are deposed on the upper side of the production chamber with the exit port located above the intake port; wherein the dip tube is in fluid communication with the production tube, and the dip tube has thief jet ports (TJP) in fluid communication with the production chamber; wherein the solids management tube is disposed on the bottom of the production chamber, and the solids management tube (SMT) has an upper opening and a lower opening, and the solids management tube (SMT) is in fluid communication with the inside and outside of the production chamber, and the solids management tube's upper opening is inside the production chamber and below the thief jet port (TJP), and the solids management tube's lower opening is outside the production chamber and below the upper opening.

In one example, the pressure loss cylinder and production cylinders have an outer diameter of 3.5 inches; the pressure loss gas relief tube has an outer diameter of 0.5 inches; and the dip tube has a diameter of 1.25 inches. In one example, the pressure loss cylinder and production cylinders have an outer diameter of 2.375 inches; the pressure loss gas relief tube has an outer diameter of 0.25 inches; and the dip tube has a diameter of 1.00 inches.

In one example, the pressure loss gas relief tube has an opening or port to the interior of the pressure loss cylinder and is disposed such that the opening or port of the pressure loss gas relief tube is above the pressure loss cylinder gas exhaust ports.

In one example, a threaded collar and hanger is used for attachment of the apparatus to other pipe or tools.

In one example, the apparatus is configured with multiple production cylinders. The production cylinders are connected vertically in series. A pressure loss gas relief tube has multiple pressure loss gas relief ports allowing for fluid communication with the interiors of multiple production cylinders. A dip tube has multiple production cylinder thief jet ports (TJP) allowing for fluid communication with the interiors of multiple production cylinders. The series of production cylinders have multiple solids management tubes with openings or ports allowing for fluid communication between the interiors of adjacent production cylinders.

In one example, a pressure loss cylinder is located at the top of the apparatus. The pressure loss gas relief tube allows gas pockets accumulated in the production cylinders, which are below the pressure loss cylinder, to vent through the pressure loss gas relief ports, into the pressure loss gas relief tube, and exit into the interior of the pressure loss cylinder due to hydrostatic pressure differential. Gas is then forced out the pressure loss cylinder exhaust ports to the exterior of the apparatus. In the example shown, the exterior of the apparatus is a well bore.

In one example, production cylinders cascade under the pressure loss cylinder. At the top of the production cylinder are two ports, the intake port and the exhaust port, also called annulus intake ports and annulus exhaust ports, respectively. The exhaust port is above the intake port. Gaseous fluid enters the production cylinder from the intake port. Because hydrostatic pressure is less at the exhaust port than the intake port, gas in the fluid exits the cylinder through the exhaust port. When the gas to liquid ratio is high, the exhaust port may become overrun and a gas packet will build in the production cylinders. As the gas packet volume builds at the top of the production cylinder, it will eventually reach the pressure loss gas relief port. Because the gas packet has greater pressure than the pressure loss gas relief tube, the gas packet will vent through the relief port, into the pressure loss gas relief tube, into the through the pressure loss cylinder, and exit the apparatus through the pressure loss exhaust port.

In one example, the production cylinder thief jet port (TJP) is a port in the dip tube. It is located with fluid communication to the lower part of the interior of the production cylinder. The thief jet port (TJP) allows for gas free fluids to enter the dip tube. The thief jet port (TJP) is jetted so that fluid is restricted and does not allow liquid flow to exceed bubble rise velocity which is approximately 6 inches per second.

In one example, the apparatus comprises two types of cylinders: a pressure loss cylinder and below it, one or more production cylinders oriented in a vertical series. A gas-liquid fluid enters the apparatus through a production cylinder intake port, located on the upper side of the cylinder but still below the top. As it does so, some gas will bubble out of the fluid and rise to the top of the production cylinder due to a hydrostatic pressure differential between the top of the production cylinder and the intake port. Some of this gas will exit the apparatus out a production cylinder exhaust port which is located on the side of the production cylinder and above the intake port.

If the gas cannot exit the exhaust port it will accumulate volume and fill the top of the production cylinder until it reaches a pressure loss gas relief port. This port is connected to a pressure loss gas relief tube which is in fluid communication with the pressure loss cylinder at the top of the apparatus. The gas enters the pressure loss gas relief port, through the pressure loss gas relief tube, and exits the gas relief tube in the pressure loss cylinder. The pressure loss cylinder has gas exhaust ports located on the side of the cylinder and below the exit point from the gas relief tube. The Gas exits the apparatus through the pressure loss cylinder gas exhaust ports.

The Liquid portion of the fluid settles towards the lower portion of the production cylinder and enters a production cylinder thief jet port (TJP) located near the bottom portion of the production cylinder and disposed on a dip tube which carries the now gasless liquid to the top of the apparatus where the fluid exits the apparatus in a desired location. The thief jet port (TJP) is jetted to restrict fluid flow and ensure that the gas can bubble out of the liquid, about 6 inches per second.

In one example, disclosed is a process for separating gas from a gas-liquid fluid downhole. The process includes:

1. The gas-liquid fluid enters a chamber, also called a production cylinder, where the gas can bubble to the top of the chamber and separates from the fluid, leaving liquid to settle towards the bottom of the chamber.
2. At the top of the chamber, above the intake point, the gas vents through exhaust ports outside the apparatus into the well bore.
3. Gas that cannot vent through exhaust ports enter a port which is in fluid communication with another chamber, also called a pressure loss cylinder, at the top of the apparatus. The hydrostatic pressure differential allows the gas to exit this higher chamber through gas exhaust ports and into the well bore.
4. The liquid at the bottom of the production cylinder flows through a thief jet port (TJP) which is located near the bottom of the production cylinder. The thief jet port (TJP) restricts flow to ensure gas bubbles out of the fluid. The gasless liquid enters the port and is in fluid communication with a specific exit of the apparatus, typically connected to a production string.
5. Multiple production cylinders may be cascaded in a vertical series, where the interiors of each adjacent cylinder are in fluid communication through a solids handle tube, or a solid management tube.

INDUSTRIAL APPLICABILITY

The method(s), apparatus, and system(s) disclosed herein have direct industrial applicability in the oil & gas extraction industry.

In summary, herein disclosed are particular structural means for utilizing chambers to separate gas from a gas-liquid fluid by utilizing hydrostatic pressure differences due to height differential, allowing gas to bubble out of the fluid and vent back into the well bore, while the now gasless liquid is collected at the bottom of chambers and sent to a desired location.

In further summary, herein disclosed are particular structural means for forcing the de-gassing of the gaseous liquid, including means for changing the velocity of the gaseous liquid (speed changes on each exit from the tubes owing to the volume difference between the tubes and the chamber), means for changing the direction of the gaseous liquid (owing to the flow changing direction from exiting one set of tubes to travel to the opening to enter the next set of tubes), and means for changing the pressure of the gaseous liquid (owing perhaps in part to evolution of gas upon entering increased volume).

These and other objectives, features, and advantages of the present invention will become apparent from the following detailed drawings and associated description that accompanying the drawings.

Although the present invention is described herein with reference to a specific preferred embodiment(s), many modifications and variations therein will readily occur to those with ordinary skill in the art. Accordingly, all such variations and modifications are included within the intended scope of the present invention as defined by the reference numerals used.

From the description contained herein, the features of any of the examples, especially as set forth in the claims, can be combined with each other in any meaningful manner to form further examples and/or embodiments.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to enable others skilled in the art to utilize the invention and such or other embodiments and with various modifications required by the particular applications or uses of the invention.

The invention claimed is:

1. An apparatus for gas and solids separation from downhole fluids comprising:

a production tube having a length in a longitudinal direction;

an outer tube disposed about the production tube;

a plurality of chambers, wherein each chamber is defined by an annular region between the outer tube and the production tube, and a first fluid barrier and a second fluid barrier, each fluid barrier disposed in an annular region between the production tube and the outer tube, wherein one of the plurality of chambers comprises a first processing chamber (PLC), wherein one of the plurality of chambers comprises a second processing chamber (PC), wherein two or more second processing chambers comprise a cascade of second processing chambers (PC), the cascade disposed longitudinally adjacent to the first processing chamber (PLC); and a terminating chamber (TC) defined by a region between the outer tube and the production tube, and a fluid barrier disposed between the terminating chamber (TC) and the second processing chamber or cascade of second processing chambers (PC), the terminating chamber (TC) disposed longitudinally adjacent to the second processing chamber or cascade of second processing chambers (PC), opposite from the first processing chamber (PLC); and wherein the production tube comprises one or more orifices (TJP) opening into one or more of the second processing chamber or cascade of second processing chambers (PC);

wherein the first processing chamber (PLC) is in fluid communication with the outside of the outer tube through one or more orifices (GE-PLC) in the outer tube, the one or more orifices disposed in the first processing chamber (PLC);

wherein the second processing chamber (PC) is in fluid communication with the outside of the outer tube through a first set of one or more orifices (GE-PC) in the outer tube, the one or more orifices disposed in an upper portion of the second processing chamber (PC);

wherein the second processing chamber (PC) is in fluid communication with the outside of the outer tube through a second set of one or more orifices (FI-PC) in the outer tube, the one or more orifices disposed in an upper portion of the second processing chamber (PC) and below the first set of one or more orifices (GE-PC);

one or more third tubes (GHT) each disposed in the second processing chamber or cascade of second processing chambers (PC) having an open end disposed in the first processing chamber (PLC),
wherein the third tube (GHT) comprises one or more orifices opening into one or more of the second processing chamber or cascade of second processing chambers (PC);
wherein one or more second processing chambers (PC) comprise a fourth tube (SMT) having a first open end disposed in a lower portion of the second processing chamber (PC) and a second open end disposed external to said second processing chamber (PC).

2. The apparatus of claim 1 wherein the production tube comprises one or more orifices (TJP) opening into the terminating chamber (TC).

3. The apparatus of claim 1 wherein the terminating chamber (TC) is in fluid communication with the outside of the outer tube through a first set of one or more orifices (GE-TC) in the outer tube, the one or more orifices disposed in an upper portion of the terminating chamber (TC).

4. The apparatus of claim 1 wherein the terminating chamber (TC) is in fluid communication with the outside of the outer tube through a second set of one or more orifices (FI-TC) in the outer tube, the one or more orifices disposed in an upper portion of the terminating chamber (TC) and below the first set of one or more orifices (GE-TC).

5. The apparatus of claim 1 wherein the one or more third tubes (GHT) have a second open end disposed in the terminating chamber (TC).

6. The apparatus of claim 1 wherein the one or more orifices (GE-PLC) disposed in the outer tube of the pressure loss chamber (PLC) are disposed in a lower portion of the pressure loss chamber (PLC) and wherein the open end of the one or more third tubes (GHT) disposed in the first processing chamber (PLC) is disposed in the upper portion of the first processing chamber (PLC).

7. The apparatus of claim 1 wherein the one or more orifices (TJP) are located towards the bottom of each second processing chamber.

8. The apparatus of claim 1 wherein the one or more orifices (TJP) are engineered to restrict fluid flowing into the production tube.

9. The apparatus of claim 1 wherein the one or more orifices (TJP) are engineered to restrict fluid flowing into the production tube such that the fluid flow rate is less than the flow rate in which the entrained gas will bubble out of the fluid.

10. The apparatus of claim 1 wherein the one or more orifices (TJP) are engineered to restrict fluid flowing into the production tube such that downward velocity of draw of the fluid within the second production chamber is at a rate is less than six inches (6") per second.

11. The apparatus of claim 1 wherein the one or more orifices (TJP) are 7/64 inch diameter holes.

12. The apparatus of claim 1 wherein the one or more orifices (TJP) are jetted to restrict flow.

13. The apparatus of claim 1 wherein the one or more orifices (TJP) increase flow slightly with each lower second production chamber.

14. The apparatus of claim 1 wherein the one or more orifices (TJP) range in size from 8/32 inch diameter to 6/32 inch diameter.

15. The apparatus of claim 1 wherein the one or more orifices (TJP) increase in size from upper to lower second production chambers.

16. The apparatus of claim 1 wherein the one or more orifices (TJP) in one or more upper second production chambers are 6/32 inch diameter and in one or more middle second production chambers are 7/32 inch diameter and in one or more lower second production chambers are 8/32 inch diameter.

17. The apparatus of claim 1 wherein at least fifteen second production chambers are used and the one or more orifices (TJP) in five or more upper second production chambers are 6/32 inch diameter and in five or more middle second production chambers are 7/32 inch diameter and in five or more lower second production chambers are 8/32 inch diameter.

18. An apparatus for gas and solids separation from down-hole fluids comprising:
one or more production cylinders having an intake port below an exhaust port;
one or more pressure loss cylinders having a gas exhaust port which allows gas to exit the apparatus into the well bore;
one or more pressure loss gas relief tubes having pressure loss gas relief ports positioned and arranged to provide fluid communication between the pressure loss cylinder and the production cylinder; and
one or more dip tubes having production cylinder thief jet ports which are in fluid communication with the production cylinder and a desired exit point for gas-less liquid; and
wherein the thief jet port restricts flow to remove gas bubbles from the fluid.

19. The apparatus of claim 18 wherein the thief jet ports are located towards the bottom of each production cylinder.

20. The apparatus of claim 18 wherein the thief jet ports are engineered to restrict fluid flowing into the dip tube.

21. The apparatus of claim 18 wherein the thief jet ports are engineered to restrict fluid flowing into the dip tube such that the fluid flow rate is less than the flow rate in which the entrained gas will bubble out of the fluid.

22. The apparatus of claim 18 wherein the thief jet ports are engineered to restrict fluid flowing into the dip tube such that downward velocity of draw of the fluid within the production cylinder is at a rate is less than six inches (6") per second.

23. The apparatus of claim 18 wherein the thief jet ports are 7/64 inch diameter holes.

24. The apparatus of claim 18 wherein the thief jet ports are jetted to restrict flow.

25. The apparatus of claim 18 wherein the thief jet ports increase flow slightly with each lower production cylinder.

26. The apparatus of claim 18 wherein the thief jet ports range in size from 8/32 inch diameter to 6/32 inch diameter.

27. The apparatus of claim 18 wherein the thief jet ports increase in size from upper to lower production cylinders.

28. The apparatus of claim 18 wherein the thief jet ports in one or more upper production cylinders are 6/32 inch diameter and in one or more middle production cylinders are 7/32 inch diameter and in one or more lower production cylinders are 8/32 inch diameter.

29. The apparatus of claim 18 wherein at least fifteen production cylinders are used and the thief jet ports in five or more upper production cylinders are 6/32 inch diameter and in five or more middle production cylinders are 7/32 inch diameter and in five or more lower production cylinders are 8/32 inch diameter.

30. A method for separating gas from a gas-liquid fluid downhole comprising:

drawing a gas-liquid fluid into a production cylinder chamber of an apparatus, configured and arranged to separate from the fluid gas bubbles toward the top of the chamber, leaving liquid to settle towards the bottom of the chamber;

venting gas near the top of the production cylinder chamber, above the intake point, through one or more exhaust ports to the outside of the apparatus into the well bore;

exiting remaining gas that does not vent through the exhaust ports into a port which is in fluid communication with a pressure loss cylinder chamber, disposed at the top of the apparatus; and flowing liquid at the bottom of the production cylinder through a thief jet port disposed near the bottom of the production cylinder; and wherein the thief jet port restricts flow to remove gas bubbles from the fluid;

wherein the thief jet port is in fluid communication with a production string.

31. The method of claim 30 further comprising:

arranging a cascaded plurality of production cylinders, each production cylinder having an interior, in a vertical series;

wherein the interiors of each adjacent cylinder are in fluid communication through a solids management tube.

* * * * *